United States Patent Office 2,939,084
Patented May 31, 1960

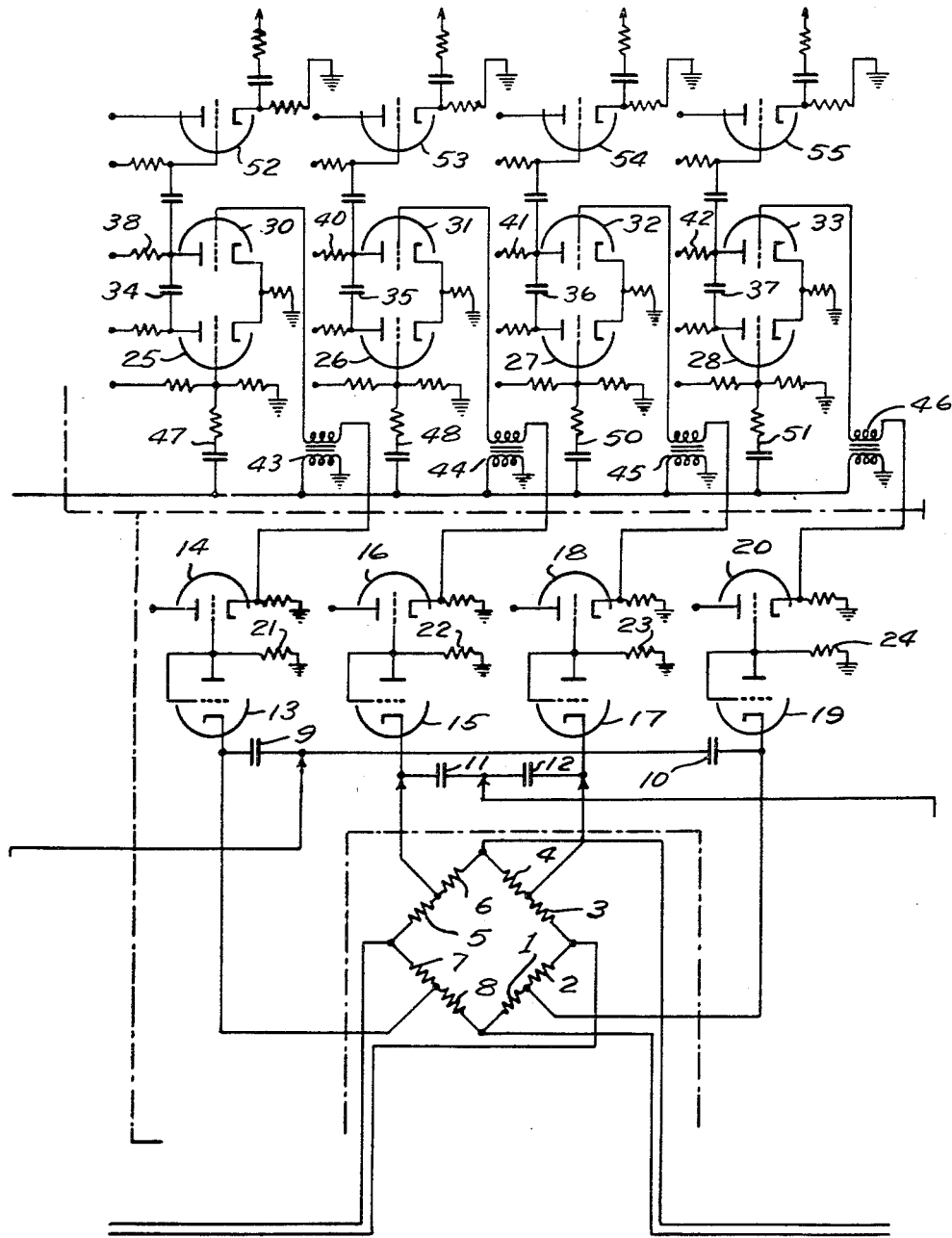

2,939,084

PHASE SHIFTER

Frederick A. Lindley, Jr., Flushing, N.Y., assignor to Smith-Meeker Engineering Company, New York, N.Y., a corporation of New York Original application Nov. 30, 1954, Ser. No. 471,987. Divided and this application May 1, 1958, Ser. No. 732,347

6 Claims. (Cl. 328—155)

This invention relates to phase shifter circuits and especially to circuits capable of producing large shifts in phase as required by certain applications in which phase shifters are employed. An example of one application of a phase shifting circuit arranged in accordance with this invention is shown in my pending application Serial No. 471,987, filed November 30, 1954, of which this application is a division. In that application, a phase shifting circuit is required in order to control the location of visual images representing simulated return echo signals on the scope of sonar equipment employing a four quadrant transducer system. The relative phases of the echo signal in each transducer channel provided for each quadrant are responsive to the train and tilt angle error and target aspect signals generated by the trainer. Because the phase shifter circuit is designed for that special application, a limiter circuit is associated with it which serves to limit the modulating or phase shifting voltage to that which would produce plus and minus 90° phase shifting corresponding to the full grid swing of the tubes in the phase shifter circuit from cut off to zero bias as the circuit has been so adjusted. When these circuits are associated with the sonar gear, it is important that the grid swing of the phase shifter tubes should be limited so that the phase shifting does not exceed plus and minus 90° as otherwise the associated sonar gear would begin to repeat the target display. However, it is preferable that a limit be placed upon the phase shifter grid swing in any case so as to prevent excessive phase modulation.

One object of the invention is to provide a relatively simple phase shifting circuit capable of large phase shifts with a minimum of amplitude modulation.

Another object of the invention is to provide a phase shifting and limiter circuit especially arranged to prevent the output from being overshifted in the plus and minus directions.

One advantage of the circuit arrangement as contemplated by the invention is that it may be operated to produce a relatively large linear phase swing with only a limited amount of amplitude variation. Moreover, this is accomplished with a high degree of reliability and stability and with a minium of circuit complexity as compared with presently existing phase shifting circuits. Other advantages and objects of the invention may be appreciated on reading the following detailed description which is taken in conjunction with the drawing which is a schematic of the phase shifting and limiting circuit.

As shown in the drawing, there is provided a specially arranged resistive source for supplying D.C. control voltages to a four channel limiter and phase shifting circuit. In accordance with the illustrated arrangement, the control voltage source comprises a diamond shape arrangement of eight equal resistors with two to a side. While the phase shifting circuit hereinafter described is not limited in its application to a sonar training device, the employment of the four channels will be explained in that context. In this connection, it must be understood that the channels serve to carry simulated echo signals to a four quadrant transducer system of the associated sonar gear. Accordingly, one of the four channels represents the bottom left transducer channel, another the bottom right transducer channel, the third channel represents the top right transducer channel, the fourth channel being the top left transducer channel. Resistors 1 and 2 of the diamond shape resistor arrangement are connected to the bottom left channel; resistors 3 and 4 are connected to the bottom right transducer channel; resistors 5 and 6 are connected to the top right transducer channel and resistors 7 and 8 to the top left transducer channel. The intermediate D.C. biases from the junctions of the two resistors on a side are fed to the corresponding limiter and phase shifter channels. The left and right points of the diamond are fed with the left and right error bias voltages and the top and bottom points are fed with the top and bottom error bias voltages from sources (not shown). Connected to the left hand inputs in advance of the phase shifters are capacitors 9 and 10. To the right hand inputs are connected capacitors 11 and 12. Through capacitors 9 and 10 an A.C. control voltage is introduced to the left hand limiter phase shifter channels and another signal of equal and opposite polarity is introduced through capacitors 11 and 12 into the right hand limiter phase shifter channels. The capacitor connections in no way disturb the biases since the capacitors cannot pass D.C. and therefore produce loading. At the same time the resistors have sufficient impedance so that the A.C. source is not excessively loaded. The circuit is actually similar to a resistance capacitor coupling as commonly employed in audio amplifiers.

The limiters circuit which receives the four control voltages from the diamond shape resistive network consists of a diode in series with the grid of a cathode follower in each channel. For example, diode 13 and cathode follower 14 are so connected in the top left channel; diode 15 and cathode follower 16 are so connected in the top right channel; diode 17 and cathode follower 18 are likewise connected in the bottom right channel and diode 19 and cathode follower 20 are connected as such in the bottom left channel. The diodes 13, 15, 17 and 19 have their plates connected to the cathode follower grids in the above arrangement with grid leak resistors 21, 22, 23 and 24, respectivley, in each combination tying the cathode follower grids to ground reference.

The action of the limiter circuits can be explained in the following manner. Consider first a signal excursion in the positive direction. This naturally carries the cathode of the diode with it and since the plate of the diode is at ground the diode ceases to conduct when the cathode reaches this potential. This opens the diode circuit and more positive signal swings cannot be passed on to the cathode follower grid. Thus the positive signal swing limit obtainable from the cathode follower is set. If signal swings in the negative direction are now considered we see that the diode will still continue to conduct carrying the diode plate and cathode follower grid along with it. Eventually the cathode follower will be cut off by its grid becoming sufficiently negative. This therefore sets the negative clipping level limit.

The voltage limit level out of the cathode follower will therefore be zero volts for the negative swings and a positive limit on positive swings determined by the positive bias on the plate of the diode. This positive voltage at the cathode of the cathode follower will be the positive limit. It should be noted that this can be adjusted independently of the input signal by the choice of cathode follower plate voltage and/or cathode resistor value as well as the bias on the plate of the diode. It will also be noted that the D.C. bias voltages have been offset and this, it will be seen, is necessary for fitting properly the phase shifter grid swing characteristics. This particular arrangement and adaptation of the limiter circuit is conditioned by the particular nature and requirements of the specific application of the phase shifter circuit.

As shown in the drawings, a dual triode tube is provided for each of the four channels. One triode section of the tubes comprises triode phase inverters 25, 26, 27 and 28 and the other triode section comprises triode phase shifters 30, 31, 32 and 33. The phase inverters have equal load resistors in the plate and cathode. The phase shifter tubes have their plates connected through quadrature capacitors 34, 35, 36 and 37 to the plates of the phase inverters. High value resistors 38, 40, 41, 42 from a B+ supply to the plates of the phase shifting tubes provide the D.C. plate voltages. Phase shifting control voltages are fed from the limiter cathode followers disposed in series with the secondary windings of transformers 43, 44, 45 and 46 to the grids of the phase shifter tubes. Signals, which represent simulated echoes when the phase shifter circuit is associated with a sonar trainer, are fed to the grids of the phase inverter tubes 25, 26, 27 and 28 through capacitor and resistance couplings 47, 48, 50 and 51, respectively, and also to the primary windings of transformers 43, 44, 45 and 46. The plate resistance of the phase shifters is controlled by the phase shifting modulating voltages placed on their grids from the limiter circuits in series with the transformer secondaries. The value of the phase shifter plate resistance is, of course, limited by cutoff bias of the tube for the negative swing and zero grid bias of the tube which is the maximum achieved voltage on the positive swing. Phase shifting circuits following this general form are capable of a maximum phase swing of 180° or plus and minus 90° providing the variable resistance can vary from zero to infinity. Since this is not possible with the phase shifter tube, less than this phase swing normally obtains. When the phase shifter tubes are acting in the above described manner as pure variable resistances their grids must be fed the same signal, equal in phase and amplitude, as their cathodes. However, by differentially adjusting the phase and amplitude of the signal on the grids of the phase shifter tubes with respect to their cathodes a much larger phase swing may be achieved. Actually, a total phase shift of over 200° is possible. Phase shifting of this magnitude is accompanied by noticeable amplitude modulation. When the device is adjusted for plus and minus 90° of phase modulation, however, an amplitude modulation of about 30% will normally follow. This variation is symmetrical with minimum amplitude at the center phase position and increasing evenly with phase rotation either way.

The plate circuit of each phase shifter is capacity coupled to an isolating cathode follower, the cathode followers being numbered respectively in the four channels from left to right 52, 53, 54 and 55. This enhances stability of performance in the phase shifters and reduces the effect of the output loading on their operation. The coupling capacitors are purposely kept small so that low frequency modulating components would be discriminated against.

It is understood that various modifications may be made in the design of both the limiter and phase shifting circuits, as above described, by persons skilled in the art without departing from the principle and scope of the invention as defined in the following claims.

What is claimed is:

1. A phase shifting circuit comprising phase inverting means, a signal source connected to said phase inverting means, a phase shifting tube having a plate, grid and cathode, the cathode of said tube being connected to one side of said phase inverting means, a quadrature capacitor connected between the plate of said phase shifting tube and the other side of said phase inverting means, a resistor connected to the plate of the phase shifting tube and adapted to apply a plate voltage to said tube, means for applying the signal voltage provided by said signal source to the grid of said phase shifting tube and means for applying to the grid of said phase shifting tube a phase shifting control or modulating voltage.

2. A phase shifting circuit comprising phase inverting means, a signal source connected to said phase inverting means, a phase shifting tube having a plate, grid and cathode, the cathode of said tube being connected to one side of said phase inverting means, a quadrature capacitor connected between the plate of said phase shifting tube and the other side of said phase inverting means, a resistor connected to the plate of the phase shifting tube and adapted to apply a plate voltage to said tube, a transformer having its primary connected to said signal source and its secondary connected to the grid of said phase shifting tube and a source of phase shifting control voltage connected in series with said secondary and adapted to apply a modulating voltage to said grid.

3. A phase shifting circuit as claimed in claim 1 wherein voltage phase shifting and amplitude controlling means are inserted between said phase inverting means and the grid of said phase shifting tube whereby the phase and amplitude of the voltage applied to said grid and said cathode of the phase shifting tube are relatively adjustable.

4. A phase shifting circuit as claimed in claim 2 wherein a coupled capacitor and shunt resistor is connected between said signal source and said phase inverting means whereby the phase and amplitude of the voltage applied to the grid and the cathode of the phase shifting tube are relatively adjustable.

5. A phase shifting circuit as claimed in claim 2 wherein an isolating cathode follower is connected to output of said phase shifting tube to prevent adverse loading effects on the performance thereof.

6. A phase shifting circuit as claimed in claim 2 wherein a limiter circuit is connected between said source of phase shifting control voltage and said phase shifting tube whereby the control voltage is prevented from having peak voltage swings beyond grid current and cut-off of the phase shifting tube.

References Cited in the file of this patent
UNITED STATES PATENTS

| | | |
|---|---|---|
| 2,085,940 | Armstrong | July 6, 1937 |
| 2,266,541 | Foster et al. | Dec. 16, 1941 |
| 2,454,426 | Beckwith | Nov. 23, 1948 |
| 2,513,809 | Martin | July 4, 1950 |
| 2,552,348 | Shapiro et al. | May 8, 1951 |
| 2,576,499 | Bowes | Nov. 27, 1951 |